US009402386B1

(12) United States Patent  
Otwell

(10) Patent No.: US 9,402,386 B1
(45) Date of Patent: Aug. 2, 2016

(54) METHOD AND APPARATUS FOR COLLAPSIBLE DECOY

(71) Applicant: W. C. Otwell, Rome, GA (US)

(72) Inventor: W. C. Otwell, Rome, GA (US)

(*) Notice: Subject to any disclaimer, the term of this patent is extended or adjusted under 35 U.S.C. 154(b) by 42 days.

(21) Appl. No.: 14/569,153

(22) Filed: Dec. 12, 2014

(51) Int. Cl.
*A01M 31/06* (2006.01)
*A01M 31/00* (2006.01)

(52) U.S. Cl.
CPC ............... *A01M 31/06* (2013.01); *A01M 31/00* (2013.01)

(58) Field of Classification Search
USPC .......................................................... 43/2, 3
See application file for complete search history.

(56) References Cited

U.S. PATENT DOCUMENTS

| 529,463 | A | 11/1894 | Roberts | |
|---|---|---|---|---|
| 4,689,913 | A | 9/1987 | Brice | |
| 6,216,382 | B1* | 4/2001 | Lindaman | A01M 31/06 248/156 |
| 6,385,895 | B1* | 5/2002 | Scaries | A01M 31/06 43/2 |
| 6,481,147 | B2 | 11/2002 | Lindaman | |
| 6,519,891 | B2 | 2/2003 | Fulcher | |
| 7,788,839 | B2 | 9/2010 | McPherson | |
| 7,828,003 | B2* | 11/2010 | Montecucco | A01M 31/025 135/117 |
| 2002/0178638 | A1* | 12/2002 | Fulcher | A01M 31/06 43/2 |
| 2012/0324777 | A1* | 12/2012 | Smith | A01M 31/06 43/2 |
| 2015/0052797 | A1* | 2/2015 | Parsons | A01M 31/06 43/2 |
| 2015/0143735 | A1* | 5/2015 | Downard | A01M 31/06 43/2 |

* cited by examiner

*Primary Examiner* — Christopher P Ellis
(74) *Attorney, Agent, or Firm* — George L Williamson

(57) ABSTRACT

Method and apparatus for a collapsible turkey decoy having a central upright rod having an upper cap thereon along with a lower sliding collar wherein a plurality of ribs or lateral frame members extend from the upper cap to the lower sliding collar so that when the lower sliding collar is in a first upward position the ribs expand outwardly to form the body of the decoy and when the lower sliding collar is in a second lower position the ribs collapse into a folded position. The ribs also have both neck and tail frame members mounted thereon over which the cover of the turkey body is mounted along with an optional tail piece assembly.

18 Claims, 3 Drawing Sheets

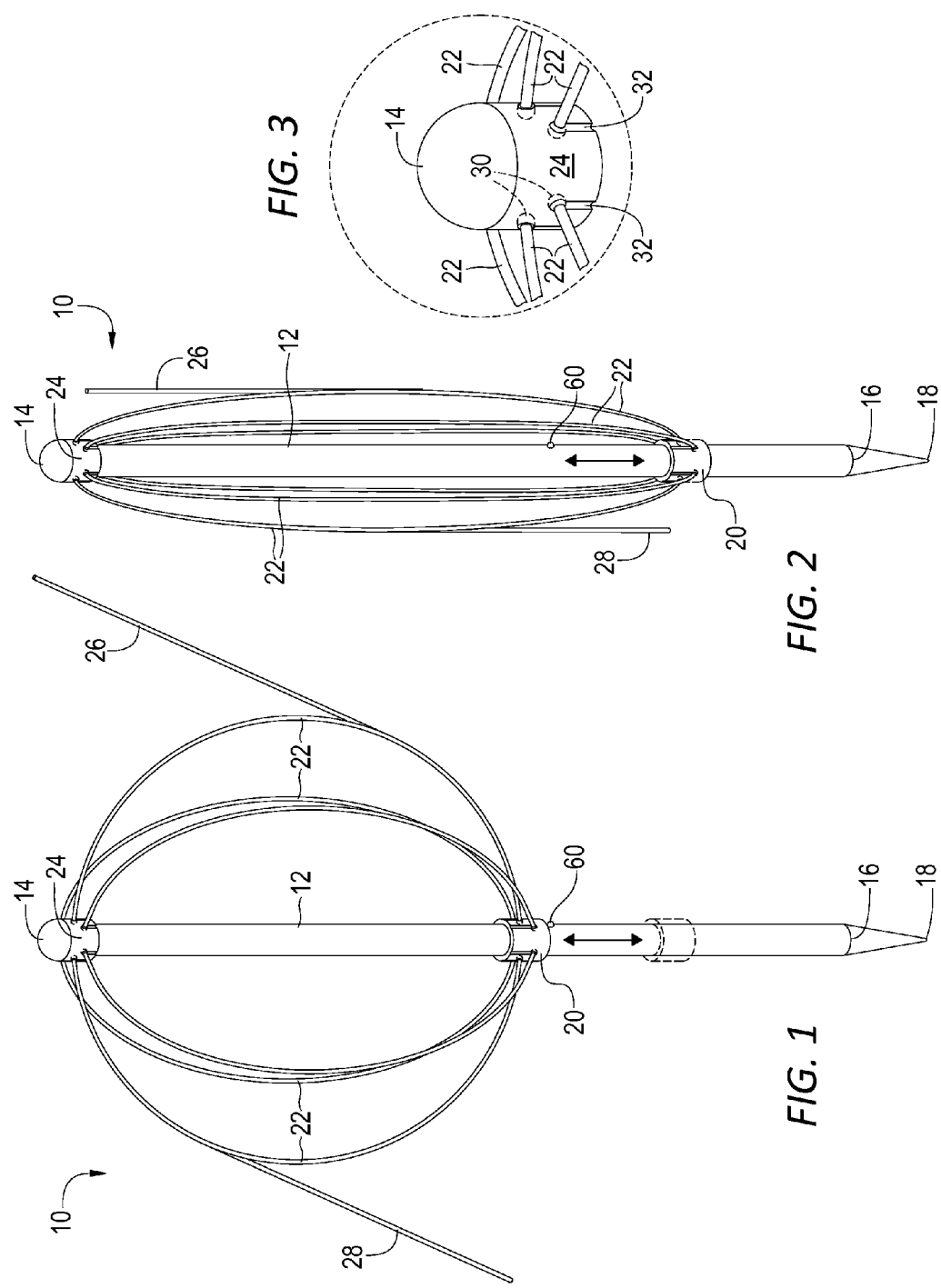

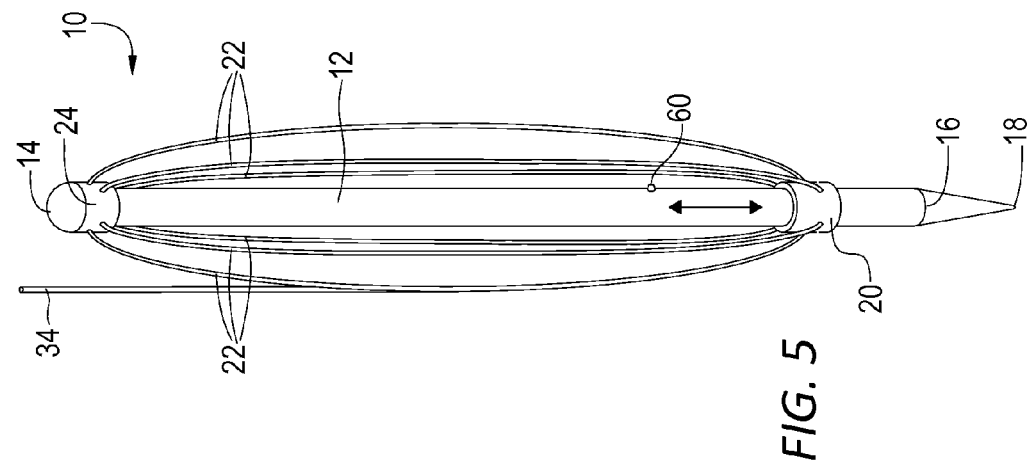
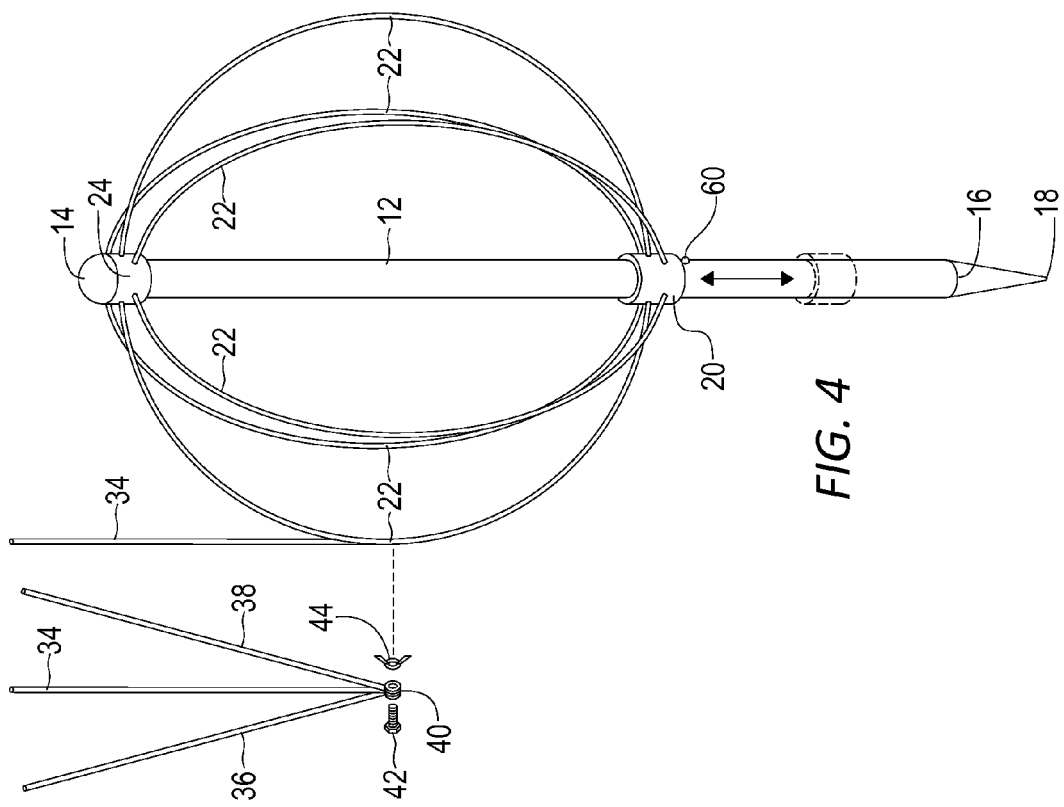

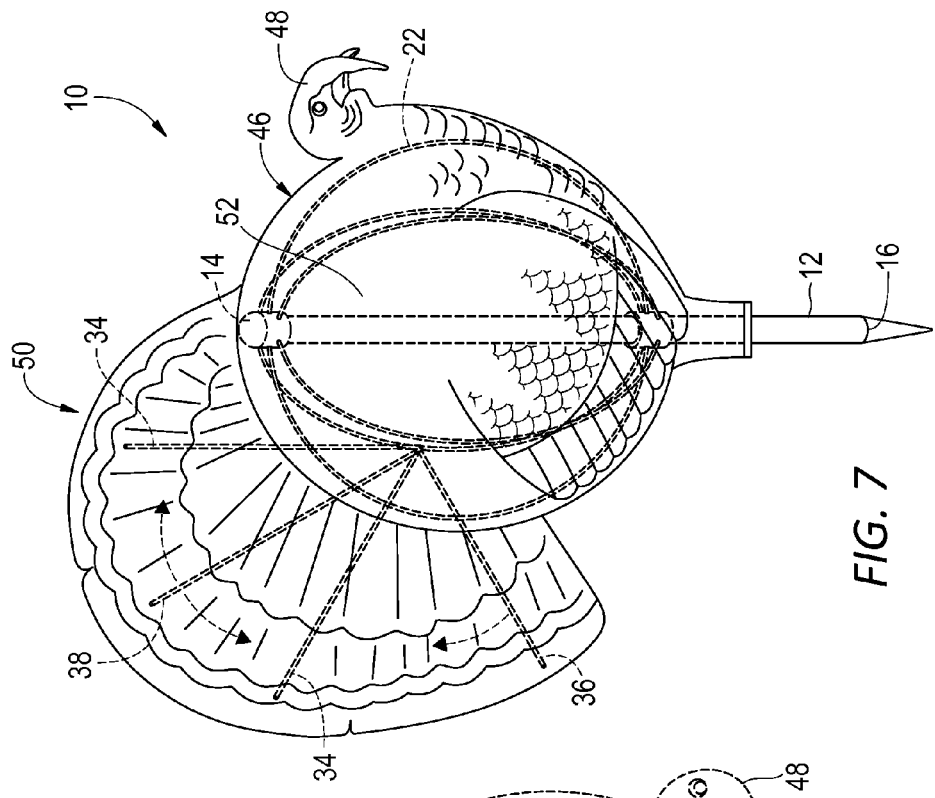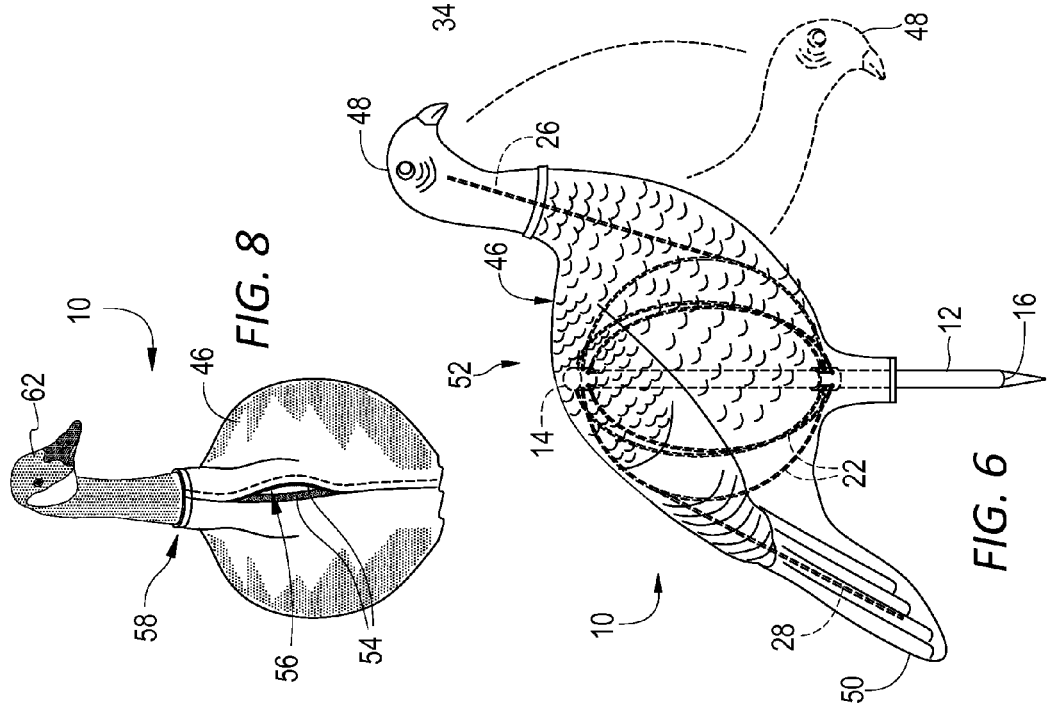

METHOD AND APPARATUS FOR COLLAPSIBLE DECOY

BACKGROUND OF THE INVENTION

1. Field of the Invention

The present invention relates generally to animal decoys and, more particularly, is concerned with a collapsible turkey or goose decoy.

2. Description of the Related Art

Devices relevant to the present invention have been described in the related art, however, none of the related art devices disclose the unique features of the present invention.

In U.S. Pat. No. 529,463 dated Nov. 20, 1894, Roberts disclosed a collapsible decoy. In U.S. Pat. No. 4,689,913 dated Sep. 1, 1987, Brice disclosed to collapsible decoy. In U.S. Pat. No. 6,216,382 dated Apr. 17, 2001, Lindaman disclosed a supporting expander for collapsible hunting decoys. In U.S. Pat. No. 6,385,895 dated May 14, 2002, Scaries disclosed a collapsible animal decoy. In U.S. Pat. No. 6,481,147 dated Nov. 19, 2002, Lindaman disclosed a hunting decoy assembly. In U.S. Pat. No. 6,519,891 dated Feb. 18, 2003, Fulcher disclosed an inflatable decoy. In U.S. Pat. No. 7,788,839 dated Sep. 7, 2010, McPherson disclosed a compressible decoy.

While these devices may be suitable for the purposes for which they were designed, they would not be as suitable for the purposes of the present invention as hereinafter described.

SUMMARY OF THE PRESENT INVENTION

The present invention discloses a method and apparatus for a collapsible bird decoy, including a turkey or goose deco a central upright rod is disclosed having an upper cap thereon along with a lower sliding collar wherein a plurality of ribs or lateral frame members extend from the upper cap to the lower sliding collar so that when the lower sliding collar is in a first upward position the ribs expand outwardly to form the body of the decoy and when the lower sliding collar is in a second lower position the ribs collapse into a folded position. The ribs also have both neck and tail frame members mounted thereon over which the cover of the turkey body is mourned. Also shown is an optional tail piece assembly which functions somewhat like a conventional fan wherein the tail of the decoy cover can be placed over the extended frame members of the fan so as to show the tail of the turkey decoy in an expanded position. The cover of the decoy is made of flexible material and made into the likeness of a male or gobbler and female or hen turkeys so that the turkeys can be shown in an upward position or a feeding position.

An object of the present invention is to provide a portable bird decoy, particularly a turkey or goose decoy, which can be used to show a bird in either a feeding position or an upright strutting position. A further object of the present invention is to provide a bird decoy which can be easily used by an operator. A further object of the present invention is to provide a collapsible bird decoy which can be easily and inexpensively manufactured. A further object of the present invention is to provide a collapsible decoy wherein an underlying frame mounted on a central rod can be easily moved from a collapsed position to an expanded position so that when the decoy is in the collapsed position it takes up very little room and can be easily stored and moved about. A further object of the present invention is to provide a collapsible bird decoy wherein the cover can be easily removed from the decoy.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the an to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 1 is a perspective view of the expanded female version of the present invention.

FIG. 2 is a perspective view of the collapsed female version of the present invention.

FIG. 3 is an enlarged view of portions of the present invention taken from FIG. 1.

FIG. 4 is a perspective view of the expanded male version of the present invention.

FIG. 5 is perspective view of the collapsed male version of the present invention.

FIG. 6 is a perspective view of the covered expanded female version of the present invention.

FIG. 7 is a perspective view of the covered expanded male version of the present invention.

FIG. 8 is a front perspective view of the covered expanded version of the present invention.

LIST OF REFERENCE NUMERALS

With regard to reference numerals used, the following numbering is used throughout the drawings.

10 present invention
12 central rod
14 dome
16 anchoring, end
18 tip of central rod
20 collar
22 lateral frame member/ribs
24 upper cap
26 neck frame member
28 tail frame member
30 enlarged end
32 aperture
34 gobbler tail member
36 left tail member
38 right tail member
40 pivoting connection
42 fastener
44 nut
46 cover
48 head
50 tail
52 body
54 hook and loop material
56 opening
58 neck of cover/decoy
60 lock
62 goose

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the an will recognize numerous other embodiments as well. For a definition of the complete scope of the invention the reader is directed to the appended claims. FIGS. 1 through 8 illustrate the present invention wherein a collapsible bird decoy, including a turkey and a goose decoy, is disclosed and which is generally indicated by reference number 10.

Turning to FIG. 1, therein is shown the present invention 10 having a central rod 12 expected to be generally in the upright position as illustrated having first and second ends wherein is shown a cap or dome 14 disposed on the upper end along with an anchoring lower end 16 having a tip 18 thereon wherein the central rod has a lower sliding collar 20 mounted thereon so that the collar can slide up and down the central rod so that when the collar is in an upward position the small rods or ribs 22 are expanded outwardly from said central rod into a circular shape and when the collar is in a lower or downward position the ribs are collapsed. The plurality of ribs 22 or lateral frame members each have first and second ends wherein the first end is connected to the lower sliding collar 20 and the upper ends are each connected to an upper cap 24 mounted on the upper end of the central rod 12 so that the lateral frame members or ribs 22 can be expanded or collapsed as previously disclosed. Also shown is a neck frame member 26 disposed on and extending from one of the ribs 22 along with to tail frame member 28 disposed on and extending from an oppositely disposed lateral rib 22 so that the neck of the cover of the collapsible decoy (now shown, see FIG. 6) can be mounted onto the neck frame member 26 and the tail of the cover (not shown, see FIG. 6) can be mounted on the tail frame member 28. Lock member 60 is shown on central rod 12 for locking the collar 20 into the upward position; the lock 60 has a head/button which is biased outwardly from the central rod and which protrudes through an aperture in the central rod so that the head/button can be operated by a finger of a user. The head/button of lock 60 can be pushed inwardly to allow the collar 20 to slide over it and then the head/button will spring outwardly to lock the collar in an upward position. Note that FIGS. 1 and 2 illustrate the female or hen turkey version of the decoy of the present invention 10 and FIGS. 4, 5 and 7 illustrate the male or gobbler turkey version of the present invention 10. Also, FIG. 8 illustrates a goose version of the present invention 10.

Turning to FIG. 2, therein is shown the present invention 10 in the collapsed position including all of the elements previously disclosed in FIG. 1 except that the collar 20 is shown in a lower position so that the ribs 22 are in the collapsed position for being stored away permanently or while being transported.

Turning to FIG. 3, therein is shown the manner in which each of the ends of the lateral frame members or ribs 22 are connected to the upper cap 24 and lower collar 20 wherein each end of each rib 22 has an enlarged ball-like end 30 disposed thereon being screwed on or otherwise attached to each end of each rib so that the ball 30 is captured on the inside of the upper cap 24 by the larger diameter ball being retained inside a smaller diameter aperture 32. There are also many other ways to connect the ends of the ribs 22 to the upper cap 24 and lower collar 20 and one such alternative way is shown by way of example in FIGS. 6 and 7 wherein the ends of the ribs are simple attached directly to the upper cap 24 and lower collar 20 as would occur, e.g., if the ribs 22, upper cap 24 and lower collar 20 were all molded as one piece.

Turning to FIG. 4, therein is shown the framework for the gobbler version of the turkey decoy of the present invention 10 similarly to what has been disclosed relative to the hen version of the turkey decoy as shown in FIG. 1. However, shown in FIG. 4 is an additional element being an upright tail member 34 which is attached to one of the ribs 22 so that the tail member is substantially in an upright position. A tail member 34 is expected to always be included with the gobbler version of the present invention 10 and it may also include optional left and right side frame members 36, 38 which will be connected together so as to be pivotable about lower end 40 so that the left and right tail members will move in a vertical plane toward or away from the centrally disposed upright tail member 34 so that the tail can be either expanded or contracted very easily by moving the left and right tail frame members 36, 38 away from or toward the central tail member 34. The three members 34, 36, 38 are connected pivotally at the lower end as shown at 40 using a fastener 42 and nut 44 or the like, so that the left and right frame members 36, 38 can easily be moved toward and away from the upright tail member 34. Note that the left and right tail members 36, 38 are an optional feature of the present invention 10; however, the upright tail member 34 will always be included with this embodiment.

Turning to FIG. 5, therein is shown the gobbler version of the present invention 10 in the collapsed position including most of the elements previously disclosed in FIG. 4 except that the collar 20 is shown in the lowered position so that the ribs 22 are in the collapsed position.

Turning to FIG. 6, therein is shown the hen version of the present invention 10 wherein the cover is generally shown at 46 being disposed about and over the hen version of the frame of the present invention 10 previously disclosed in FIG. 1. The cover 46 is shown disposed about, over or around the hen version of the interior frame as previously shown in FIG. 1 which frame includes the central rod 12, dome 14, anchoring end 16, tip 18, collar 20, lateral frame members or ribs 22, upper cap 24, neck frame member 26, tail frame member 28. The cover 46 of the present invention 10 is made of flexible material and includes the head 48 of the turkey, the tail 50 of the turkey and the enlarged, centrally disposed body 52 of the turkey. Note that the head 48 of the turkey is also shown in a lowered or feeding position using phantom lines so as to illustrate that the head 48 can be manufactured so as to be disposed in either an upper position or a lower feeding position.

Turning to FIG. 7, therein is shown the gobbler version of the present invention 10 wherein the cover 46 has been placed over the interior frame as previously shown in FIG. 1 including the central rod 12, dome 14, anchoring end 16, tip 18, collar 20, lateral frame members or ribs 22, upper cap 24, neck frame member 26, tail frame member 28, all of which have been previously disclosed with respect to FIG. 1. The cover 46 of the present invention 10 is made of flexible material and includes the head 48 of the turkey, the tail 50 of the turkey and the main body 52 of the turkey. Also shown being, covered is the gobbler tail member 34, left gobbler tail member 36, and right gobbler tail member 38 along with the pivoting connection 40, all of which has been previously disclosed with respect to FIG. 4.

Turning to FIG. 8, therein is shown a front perspective view of the present invention 10 showing the cover 46 mounted onto the frame (not shown, see FIG. 1) wherein the cover 46 is shown having mating hook and loop material 54 on the front neck 58 of the decoy wherein the hook and loop material can be opened to create an opening 56 in the cover 46 so that the cover can be placed about the frame of the present invention 10 and then have the cover reclosed tightly about the neck 58 of the present invention 10. Alternative means for closing opening 56 may also be used including sewing, buttons, snaps or the like. Also shown is a goose head 62 illustrating that the present invention 10 can be made to resemble a goose and that the cover 46 can also be made to resemble a goose so as to be used a goose decoy.

The present invention 10 can be summarized as follows and by reference to FIGS. 1-8, as a method for making a bird decoy by providing a central rod 12 having upper and lower ends and having a tip 18 disposed on the lower end for insertion into a ground so that the central rod is substantially upright; providing a slidable collar 20 on the central rod; providing a plurality of ribs 22 extending from the upper end of the central, rod to the collar and spacing the ribs apart around the central rod; wherein the collar has an upward position wherein the ribs are circular shaped, and, the collar has a downward position wherein the ribs are collapsed; providing a lock 60 for securing the collar in the upward position; and, covering the bird decoy with a cover 46 so that the bird decoy is configured into the likeness of a bird when the collar is in the upward position. Further, providing a neck frame member 26 on one of the plurality of ribs so that a neck portion of the cover can be mounted thereon. Further, providing a tail frame member 28 on one of the plurality of ribs so that a tail portion of the cover can be mounted thereon. Further, providing an upright tail member 34 disposed on one of the plurality of ribs so that an upright tail portion of the cover can be mounted thereon; wherein the upright tail member includes a plurality of upright tail members including a left 36, a central 34 and a right 38 tail member; wherein the plurality of upright tail members are pivotally connected 40 to each other on a lower end, wherein the lock is disposed on the central rod, the lock has a head 60 protruding through an aperture of the central rod for being operated by a linger of a user.

I claim:

1. A bird decoy, comprising:
   a) a central rod having upper and lower ends, a cap disposed on said upper end, a tip disposed on said lower end for insertion into a ground so that said central rod is substantially upright;
   b) a collar, said collar being slidably disposed on said central rod;
   c) a plurality of ribs extending from said upper end of said central rod to said collar, herein said ribs are spaced apart around said central rod;
   d) said collar having an upward position wherein said ribs are circular shaped, and, said collar having a downward position wherein said ribs are collapsed;
   e) a lock for securing said collar in said upward position; and,
   f) a cover, said cover being configured into the likeness of a bird when said collar is in said upward position, and said cover for covering the bird decoy.

2. The bird decoy of claim 1, further comprising a neck frame member disposed on one of said plurality of ribs so that a neck portion of said cover can be mounted thereon.

3. The bird decoy of claim 2, further comprising a tail frame member disposed on one of said plurality of ribs so that a tail portion of said cover can be mounted thereon.

4. The bird decoy of claim 3, further comprising an upright tail member disposed on one of said plurality of ribs so that an upright tail portion of said cover can be mounted thereon.

5. The bird decoy of claim 4, said upright tail member further comprising a plurality of upright tail members including a left, a central and a right tail frame member.

6. The bird decoy of claim 5, wherein said plurality of upright tail members are pivotally connected to each other on a lower end.

7. The bird decoy of claim 6, wherein said lock is disposed on said central rod, said lock having a head protruding through an aperture of said central rod, said head being operable by a finger of a user so that said collar is slidable along said central rod.

8. The bird decoy of claim 7, wherein the bird decoy resembles a turkey.

9. The bird decoy of claim 7, wherein the bird decoy resembles a goose.

10. A method for making a bird decoy, comprising the steps of:
    a) providing a central rod having upper and lower ends and having a tip disposed on the lower end for insertion into a ground so that the central rod is substantially upright;
    b) providing a slidable collar on the central rod;
    c) providing a plurality of ribs extending from the upper end of the central rod to the collar and spacing the ribs apart around the central rod;
    d) wherein the collar has an upward position wherein the ribs are circular shaped, and, the collar has a downward position wherein the ribs are collapsed;
    e) providing a lock for securing the collar in the upward position; and,
    f) covering the bird decoy with a cover so that the bird decoy is configured into the likeness of a bird when the collar is in the upward position.

11. The method of claim 10, further comprising, the step of providing a neck frame member on one of the plurality of ribs so that a neck, portion of the cover can be mounted thereon.

12. The method of claim 11, further comprising, the step of providing a tail frame member on one of the plurality of ribs so that a tail portion of the cover can be mounted thereon.

13. The method of claim 12, further comprising the step of providing an upright tail member on one of the plurality of ribs so that an upright tail portion of the cover can be mounted thereon.

14. The method of claim 13, wherein the upright tail member includes a plurality of upright tail members including a left, a central and a right tail member.

15. The method of claim 14, wherein the plurality of upright tail members are pivotally connected to each other on a lower end.

16. The method of claim 15, wherein the lock is disposed on the central rod, the lock having a head protruding through an aperture of the central rod for being operated by a finger of a user.

17. The method of claim 16, wherein the bird decoy resembles a turkey.

18. The method of claim 16, wherein the bird decoy resembles a goose.

* * * * *